United States Patent
Konno

(10) Patent No.: US 7,606,967 B2
(45) Date of Patent: Oct. 20, 2009

(54) FRAME TRANSFER METHOD AND APPARATUS

(75) Inventor: Yuuji Konno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 121 days.

(21) Appl. No.: 11/192,106

(22) Filed: Jul. 29, 2005

(65) Prior Publication Data
US 2006/0212598 A1 Sep. 21, 2006

(30) Foreign Application Priority Data
Mar. 18, 2005 (JP) ............................. 2005-079838

(51) Int. Cl.
*G06F 12/00* (2006.01)
*G06F 13/00* (2006.01)
*G06F 13/28* (2006.01)

(52) U.S. Cl. ........................................................ 711/108
(58) Field of Classification Search .................. 711/108
See application file for complete search history.

(56) References Cited

U.S. PATENT DOCUMENTS

| 5,448,565 | A | * | 9/1995 | Chang et al. ................ 370/402 |
| 5,815,500 | A | * | 9/1998 | Murono ........................ 370/401 |
| 6,032,187 | A | * | 2/2000 | Blain ............................ 709/230 |
| 6,065,061 | A | * | 5/2000 | Blahut et al. ................. 709/239 |
| 6,192,051 | B1 | * | 2/2001 | Lipman et al. .............. 370/389 |
| 2002/0108019 | A1 | * | 8/2002 | Allen et al. .................. 711/118 |

FOREIGN PATENT DOCUMENTS

| JP | 08-070319 | 3/1996 |
| JP | 2002-24162 | 1/2002 |

* cited by examiner

*Primary Examiner*—Matt Kim
*Assistant Examiner*—Ralph A Verderamo, III
(74) *Attorney, Agent, or Firm*—Hanify & King P.C.

(57) ABSTRACT

In a frame transfer method and apparatus, a data entry into a content addressable memory is set to enable, and upon receipt of a transfer frame addressed to a first apparatus from a line bus, header information of the frame is entered into the content addressable memory based on the setting that the entry is enabled. The frame prepared based on header information entered into a content addressable memory of a second apparatus and transmitted by the second apparatus can be used, and the frame is discarded when it is not addressed to the first apparatus. Furthermore, normal frame processing is performed when the entry is not enabled by the setting.

11 Claims, 12 Drawing Sheets

FIG.9A
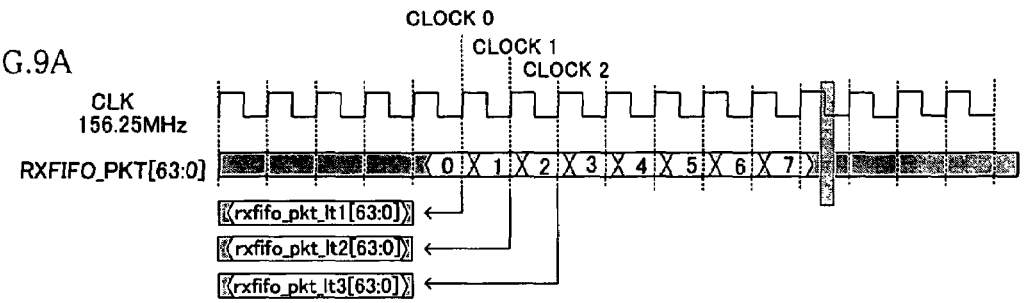
FIG.9B
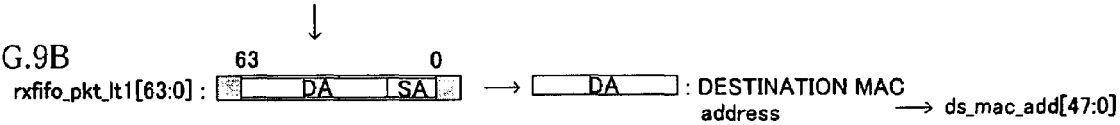
FIG.9C
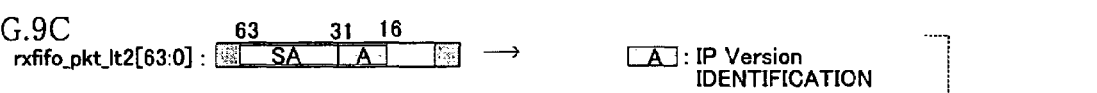
FIG.9D
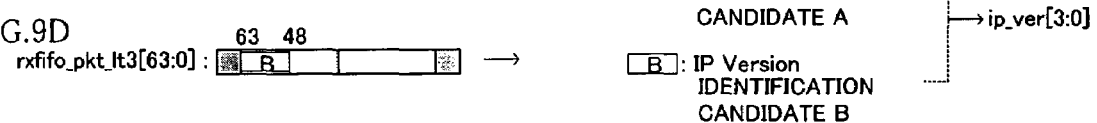
FIG.9E
| IP VERSION IDENTIFYING PROCEDURE | | |
|---|---|---|
| WHEN IP VERSION IDENTIFICATION CANDIDATE "A" IS: | AND IDENTIFICATION CANDIDATE "B" IS: | THEN |
| 1) 0x8100 (FRAME WITH TAG) | 0x08000 | IPV4 |
| 2) 0x8100 (FRAME WITH TAG) | 0x086DD | IPV6 |
| 3) 0x8100 (FRAME WITH TAG) | OTHER THAN ABOVE | DISCARD |
| 4) OTHER THAN 0x8100 | 0x08000 | IPV4 |
| 5) OTHER THAN 0x8100 | 0x086DD | IPV6 |
| 6) OTHER THAN 0x8100 | OTHER THAN ABOVE | DISCARD |

FRAME TRANSFER METHOD AND APPARATUS

BACKGROUND OF THE INVENTION

1. Field of the Invention

The present invention relates to a frame transfer method and apparatus, and in particular to a method and apparatus for entering data into a content addressable memory (CAM) used for transferring or relaying an IP frame (hereinafter, simply referred to as frame) in a router or the like.

2. Description of the Related Art

FIG. 10 shows an arrangement of a prior art frame transfer apparatus using a content addressable memory. This frame transfer apparatus is composed of devices 1 and 2 sequentially and serially connected with a line bus B1 from a line interface LI, a bus bridge 3 further connected to the devices 1 and 2 with the line bus B1, a content addressable memory 4 connected to the bus bridge 3 with a local bus B2 and a CPU 5 further connected to the bus bridge 3 through a PCI bus B3. The PCI bus B3 is also connected to the devices 1 and 2.

The device 1 is an LSI, for example, having a function of processing data belonging to the first layer (PHY: physical layer) of the OSI reference model, or specifically processing data associated with a cable material, a connector shape and a mutual conversion system (regulation of voltage and the like) between data and electric signals.

Also, the device 2 is an LSI, for example, belonging to a MAC (Media Access Control) layer that is a lower layer within a data link layer in the OSI reference model, and having a function of processing data associated with a transmitting/receiving direction of a frame, a frame format, an error detecting method, and the like.

Also, the bus bridge 3 is an LSC (Load Sharing Controller) having a load balancing function of a frame (packet), determines a distributing destination (transferring destination) based on the header information of an arrived frame, rewrites source/destination MAC addresses, and transmits the frame to the destination of distribution.

It is also required that relay information necessary for the frame distribution is entered into the content addressable memory 4.

FIG. 11 shows a table format within the content addressable memory 4. In FIG. 11, an entry code (4 bits) is for identifying entry types (IPv4DA, IPv4SA, IPv6DA and IPv6SA). Also, a VID is a code for identifying a VLAN ID of an IP frame. An IP DA indicates a destination IP address of the IP frame, and an IP SA indicates a source IP address thereof.

Header information of the IP frame that is an object of the distribution is stored in the content addressable memory 4, so that as a result of a retrieval from the content addressable memory 4, the MAC address is rewritten for a hit frame to perform a packet transfer (normal operation corresponding to processing excluding step S5 in the example of a normal operation shown in FIG. 4 which will be described later).

In such a frame transfer apparatus, when the header information of the IP frame is entered into the content addressable memory 4, a data transfer between the PCI bus B3 where the CPU 5 is connected and the local bus B2 where the content addressable memory 4 is connected is performed through the bus bridge 3. Namely, when the CPU 5 accesses the content addressable memory 4 on the local bus B2, the CPU 5 firstly makes a request to the bus bridge 3 on the PCI bus B3 (FIG. 10(b)), so that a read cycle is generated for the content addressable memory 4 on the local bus B2, and after the header information is obtained, the header information is transferred through the PCI bus B3.

A timing chart for such an entry operation into the content addressable memory 4 is shown in FIG. 12A.

In FIG. 12A, "CLK 33" indicates a clock of the PCI bus (33 MHz). "AD[31:0]" indicates an address (ADR) and a data bus (WDT) of the PCI bus B3. "nCBE[3:0]" indicates an address command (CMD) and byte enable (BE) of the PCI bus B3. "PAR" indicates a parity (AP: address parity, DP: data parity) of the PCI bus. "nFRAME" indicates a frame signal of the PCI bus B3. "nIRDY" indicates an initiator ready signal of the PCI bus B3. "nDEVSEL" indicates a device selection signal of the PCI bus B3. "nTRDY" indicates a target ready signal of the PCI bus B3. "nSTOP" indicates a STOP signal of the PCI bus B3. "CLK2X" indicates a clock (156.25 MHz) of the local bus B2. "REQSTB" indicates a bus request signal of the local bus B2. "INST" indicates a bus command (Instruction) signal of the local bus B2. "GMASK" indicates a bus command (GlocalMask register selection) signal of the local bus B2. "REQDATA[71:0]" indicates a data bus of the local bus B2.

On the other hand, there is a packet processing system where packets transmitted from LAN housing parts are stored in the reception parts of the respective IAN housing parts without being stored in a CAM controller, so that in the middle of storing the data of the packets, the destination address and source address of the packet data are extracted by the CAM controller, and filtering and routing are executed (see e.g. patent document 1).

Also, there is a device and method for transferring data in which a bus bridge is connected between a system bus and a local bus, data transferred on the system bus among a CPU, I/O equipment and a main storage device are held via an associated memory control part into an associated memory, and when access from the I/O equipment on the local bus to the data occurs, the data are transferred from the associated memory to the. I/O equipment (see e.g. patent document 2).

[Patent document 1] Japanese Patent Application Laid-open No. 8-70319
[Patent document 2] Japanese Patent Application Laid-open No. 2002-24162

In the prior art frame transfer apparatus shown in FIG. 10, the data transfer is slowed when the PCI bus B3 is in use since a delay time occurs before the bus bridge 3 on the PCI bus B3 is accessed and the data is transferred to the content addressable memory 4 from the bus bridge 3. Also, if the data volume entered into the content addressable memory 4 is large, there has been a problem that an enormous amount of time is required before the completion of the entire data entry since the data conversion between the PCI bus B3 and the local bus B2 takes time.

SUMMARY OF THE INVENTION

It is accordingly an object of the present invention to provide a frame transfer method and apparatus which enable a data entry to a content addressable memory without using a PCI bus, thereby reducing time until entry completion.

In order to achieve the above-mentioned object, a frame transfer method according to the present invention comprises the steps of setting to enable a data entry into a content addressable memory; and entering, upon receipt of a transfer frame addressed to a first apparatus from a line bus, header information of the frame into the content addressable memory based on the setting that the entry is enabled.

The present invention will now be described referring to FIG. 1 showing a principle thereof. In the present invention, the data entry into the content addressable memory 4, which was conventionally performed through the PCI bus B3, is performed through the line bus B1. In this case, the CPU 5 performs setting the entry enable through the PCI bus B3 (FIG. 1(a)). After thus setting the entry enable, the bus bridge 3 enters the header information of the frame from the line bus B1 into the content addressable memory 4 through the local bus B2.

Accordingly, since the entry into the content addressable memory 4 is performed through the line bus B1 in the present invention, an entry speed (several 100 MHz-GHz) is extremely enhanced compared to the conventional PCI bus speed (33 MHz), so that the CPU processing time required for the entry can be reduced substantially.

A frame transfer apparatus according to the present invention realizing such a frame transfer method comprises: means setting to enable a data entry to a content addressable memory; and means entering, upon receipt of a transfer frame addressed to the apparatus from a line bus, header information of the frame into the content addressable memory based on the setting that the entry is enabled.

In the above-mentioned frame transfer method and apparatus, the above-mentioned frame may be a frame prepared based on header information entered into a content addressable memory of a second apparatus and transmitted by the second apparatus.

Therefore, as shown in FIG. 2, when it is desired that the same entry information is set further in the frame transfer apparatus 200 from the frame transfer apparatus 100 in which entry information from a console 100a (corresponding to CPU 5 of FIG. 1) is set, the entry information can be transferred with the line bus B1, so that the data transfer to the content addressable memory can be performed at a high speed.

Also, the above-mentioned frame transfer method or apparatus may further comprise the step or means of discarding the frame when the frame is not addressed to the first apparatus.

Moreover, normal frame processing may be performed when the entry is not enabled by the setting.

Also, the frame may be discarded when the frame is neither an IPv4 frame nor an IPv6 frame.

Also, the frame may be discarded when the frame is not entered into the content addressable memory.

Also, the frame may be generated by a frame generating function of the first apparatus and the frame transfer apparatus may have a function of transmitting the frame to the second apparatus.

Also, whether or not the frame is a frame with a Tag may be determined.

Moreover, the frame generating function may have a function of generating both of the IPv4 and IPv6 frames.

According to the present invention, the data entry into the content addressable memory which has been performed through the PCI bus is performed through the line bus of a higher speed, so that an access to the content addressable memory at a higher speed is made possible. Also, when it is desired that the same entry information is set between the frame transfer apparatuses, the entry information can be transferred with the line bus, so that the data transfer to the content addressable memory can be performed at a high speed. Moreover, since the entry access is performed from the line bus directly to the content addressable memory, the CPU is not involved, so that there is an effect of shortening the CPU occupation time.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 9A-9E are diagrams illustrating an operation within a header identifying portion;

DESCRIPTION OF THE EMBODIMENTS

Figure 1:
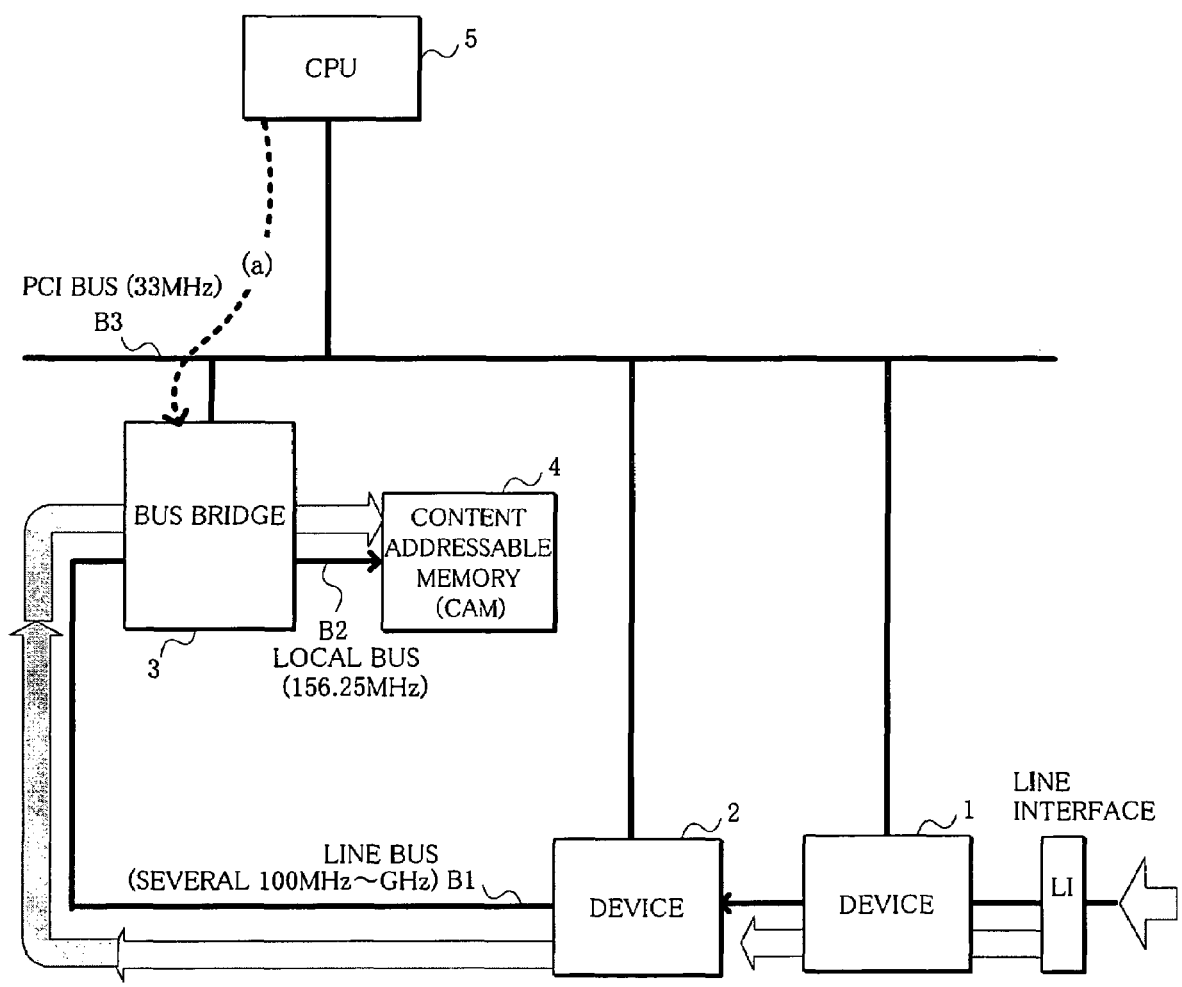
FIG. 1 is a block diagram showing a principle of a frame transfer method and apparatus according to the present invention.
Figure 2:
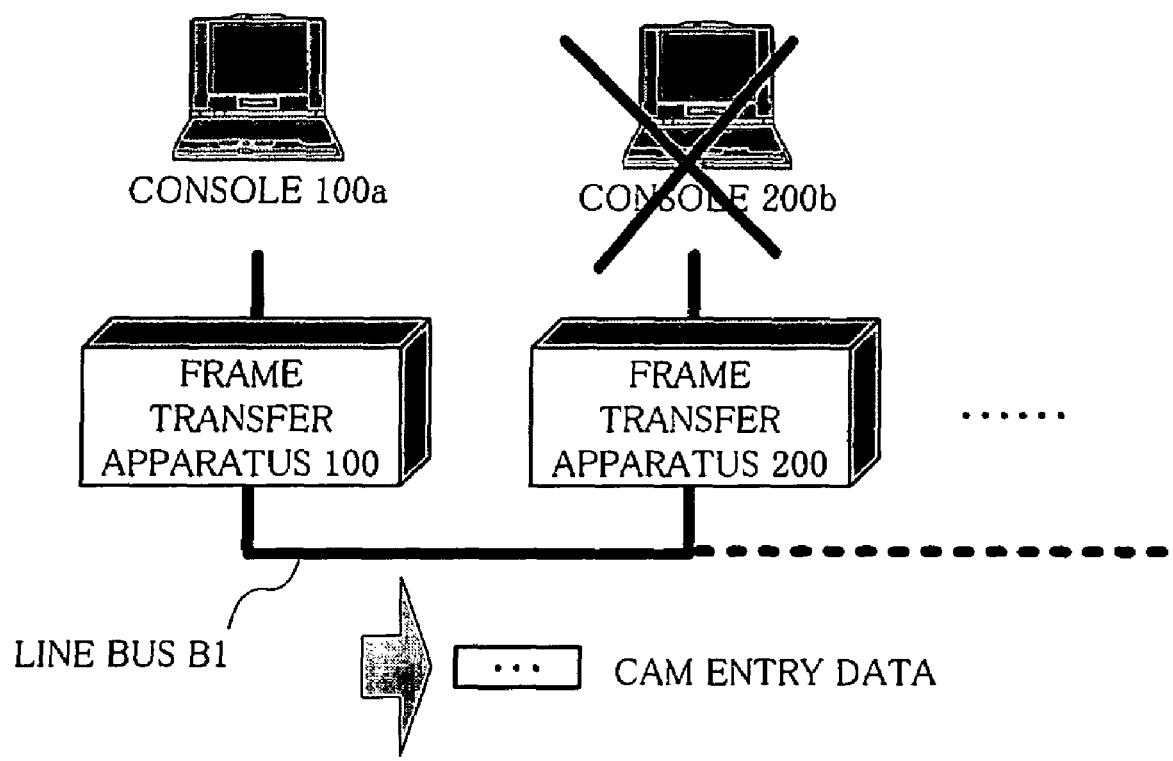
FIG. 2 is a diagram illustrating a CAM entry between frame transfer apparatuses by the present invention.
Figure 3:
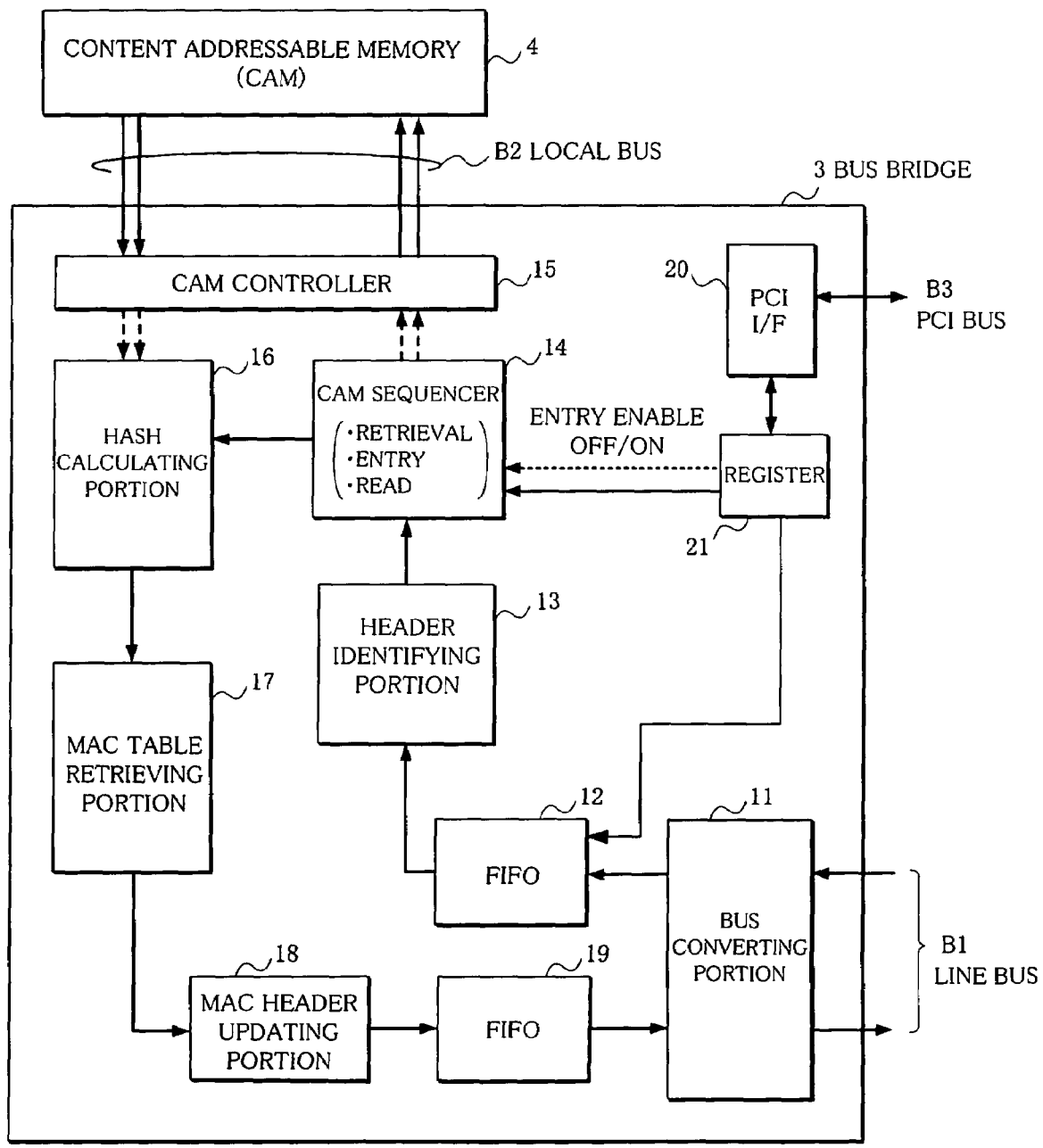
FIG. 3 is a block diagram showing an embodiment of a bus bridge used in a frame transfer apparatus according to the present invention.

FIG. 3 shows an embodiment of an apparatus realizing the frame transfer method of the present invention shown in FIG. 1 and specifically shows in detail the embodiment of the arrangement of the bus bridge 3. In this embodiment, the bus bridge 3 is composed of a bus converting portion 11 connected to the line bus B1, a FIFO 12 storing a frame whose bus is converted by the bus converting portion 11, a header identifying portion 13 identifying the header information in the frame outputted from the FIFO 12, a CAM sequencer 14 performing a retrieval, an entry (write), or a read based on the header information identified by the header identifying portion 13, a CAM controller 15 controlling the content addressable memory 4 according to an instruction signal from the CAM sequencer 14, a hash calculating portion 16 performing a hash calculation for the data obtained from the content addressable memory 4 by the CAM controller 15, a MAC table retrieving portion 17 retrieving from the MAC table based on the header information converted by the hash calculating portion 16, a MAC header updating portion 18 updating the MAC header based on the retrieval result by the MAC table retrieving portion 17, a FIFO 19 holding a frame based on the header information updated by the MAC header updating portion 18 and transmitting the frame to the bus converting portion 11, a PCI interface portion (I/F portion) 20 performing interface with the PCI bus P3 and a register 21 performing delivery of data between the PCI interface portion 20 and the CAM sequencer 14.

Hereinafter, an embodiment of a frame transfer operation by the bus bridge 3 will be described separately for the cases of normal operation and CAM entry.

Figure 4:
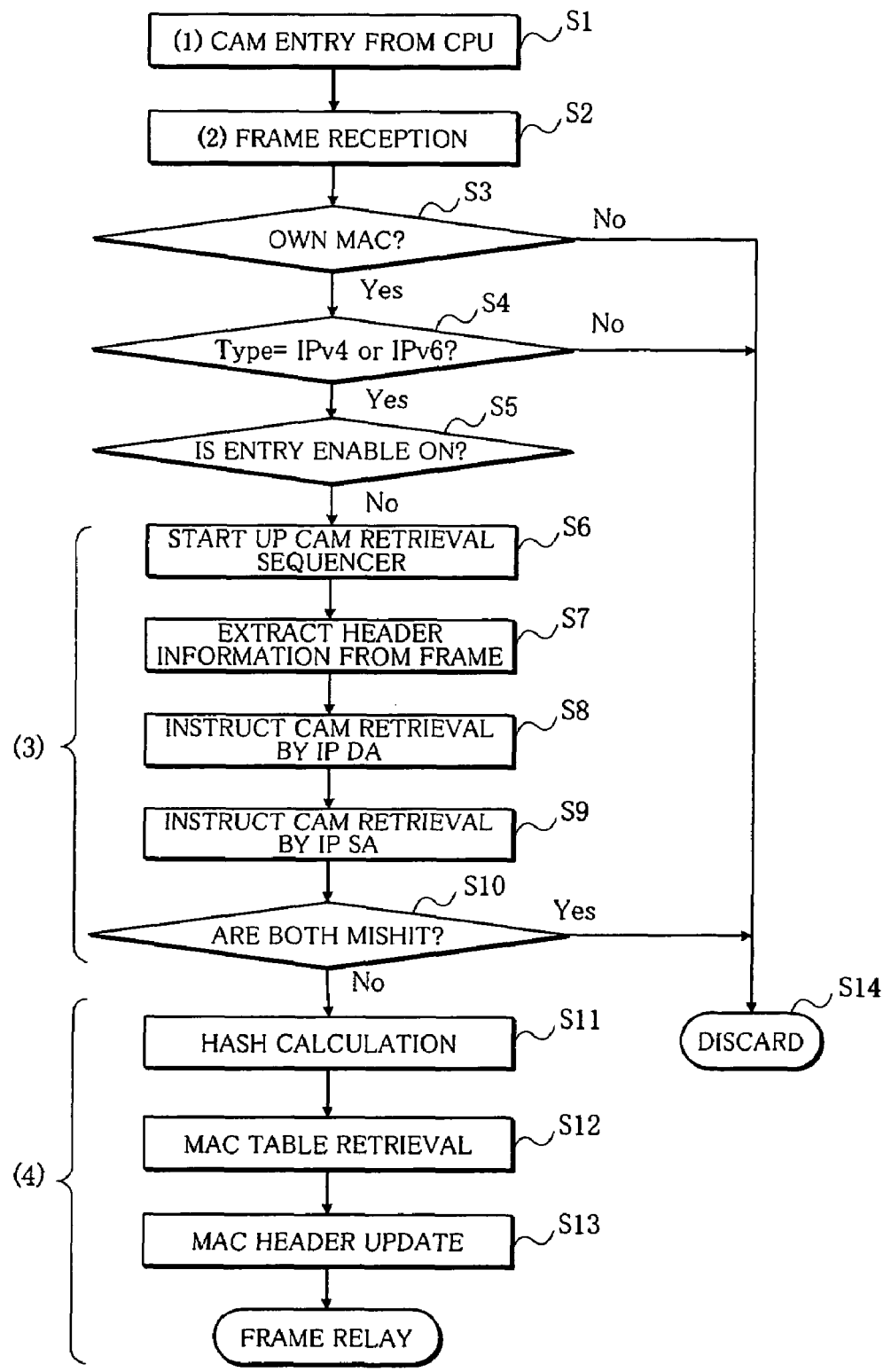
FIG. 4 is a flow chart showing an operation embodiment during a normal operation in the bus bridge shown in FIG. 3.

During Normal Operation:

In the flow chart shown in FIG. 4 showing the operation example during a normal operation, the frame transfer apparatus 100 firstly performs an entry (CAM entry at step S1; (1) in FIG. 5) of the data (header information) saved in the memory 6 into the content addressable memory 4 from the CPU 5 connected to the apparatus 100 itself through the PCI bus B3. As shown by dotted lines in FIG. 5, the header information, i.e. VID, IP version, IP SA and IP DA within a frame as shown in FIG. 6 is written from the CPU 5 through the PCI bus B3, further through the PCI interface 20, the register 21, the CAM sequencer 14 and CAM controller 15, and from the local bus B2 in the content addressable memory 4.

Figure 5:
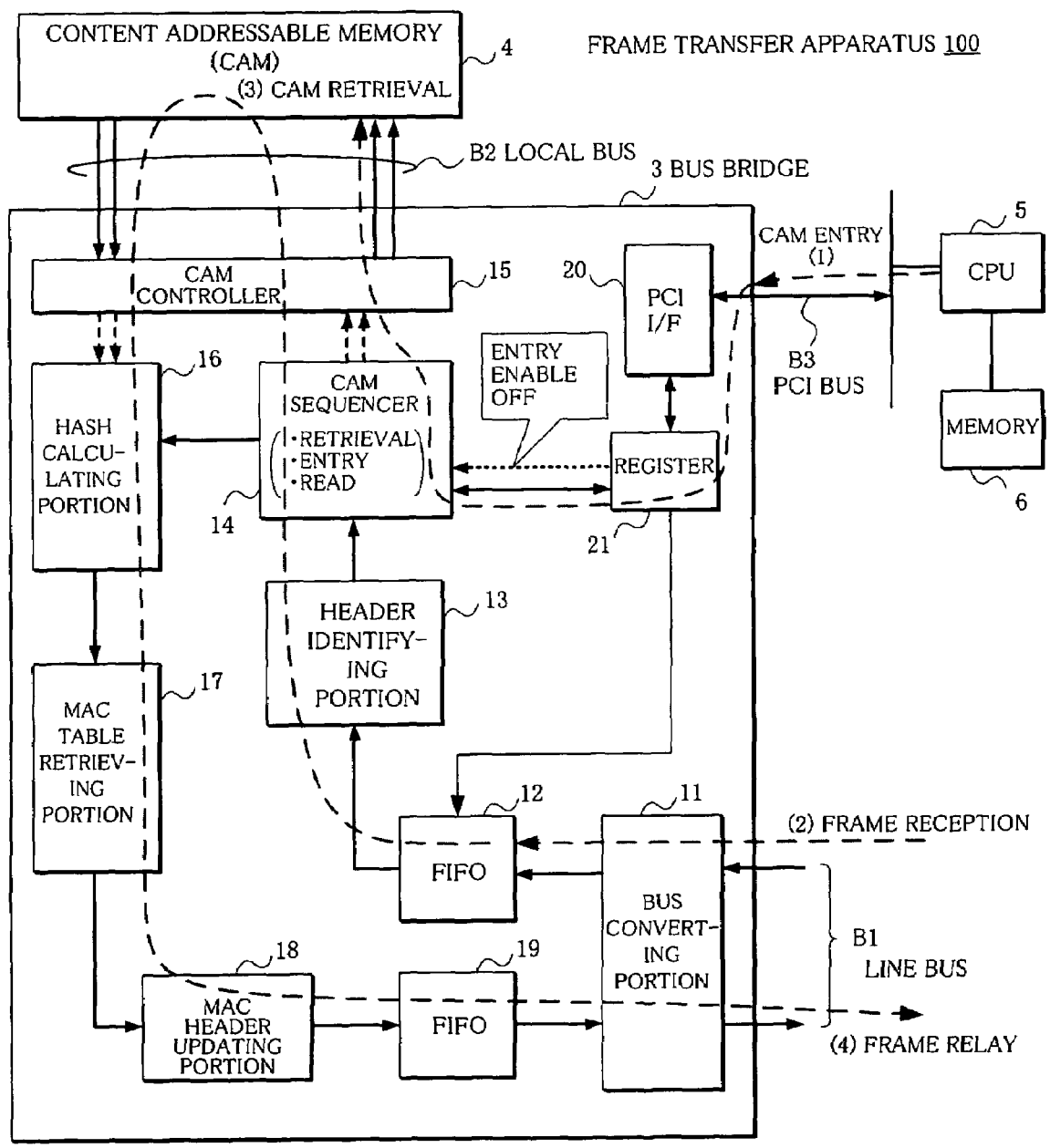
FIG. 5 is a block diagram schematically showing the operation embodiment shown in FIG. 4 in the arrangement shown in FIG. 3.

In such a state, it is supposed that the frame transfer apparatus 100 receives a frame (at step S2) as shown by (2) in FIG. 5 from the line bus B1. The frame thus received is transmitted to the header identifying portion 13 through the bus converting portion 11 and the FIFO 12. The header identifying portion 13 determines whether or not the MAC address of the bus bridge 3 of the frame transferring apparatus 100 is included (at step S3), and discards the frame (at step S14) when the MAC address of the apparatus 100 itself is not included.

Figure 6:
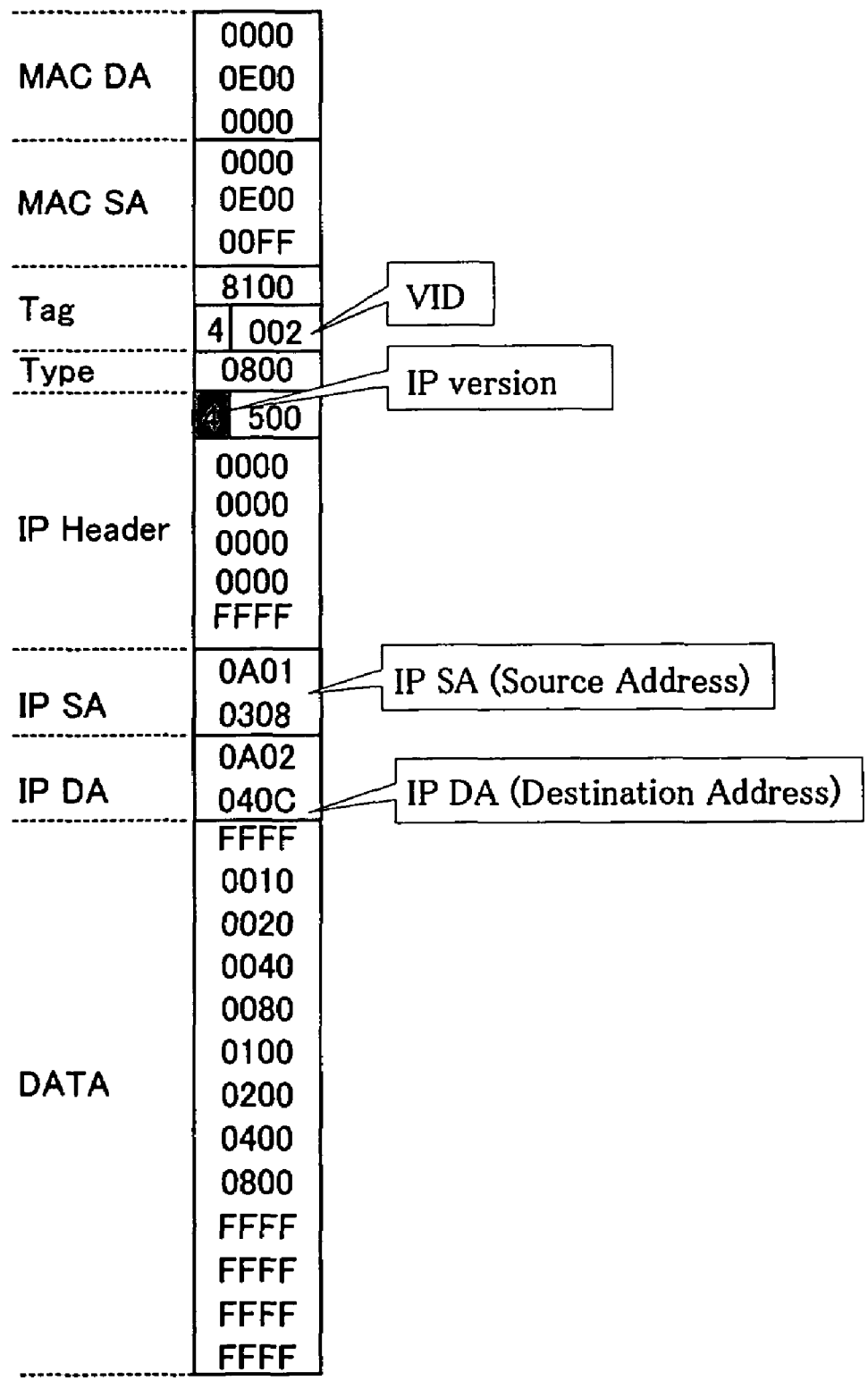
FIG. 6 is a diagram showing header information entered into a content addressable memory and a frame format thereof (in case of IPV4 frame)

When it is found that the received frame is a frame addressed to the bus bridge 3, it is further determined whether the Type is IPv4 or IPv6 as shown in FIG. 6 (at step S4). The process proceeds to step S5 only when the Type belongs to either of the two. Otherwise, the frame is discarded (at step S14).

At step S5, the CAM sequencer 14 determines whether the entry enable provided by the register 21 is "ON" or "OFF". The example shown in FIG. 4 is for the normal operation, so that the entry enable is set to "OFF". Therefore, the CAM sequencer 14 is started up (at step S6), the header information shown in FIG. 6 is extracted from the frame (at step S7), and instructions are given to the CAM controller 15 for retrieval from the content addressable memory 4 using the IP DA and the IP SA within the header information (at steps S8 and S9). Accordingly, the CAM controller 15 provides the content addressable memory 4 with the header information, so that the content addressable memory 4 executes the CAM retrieval as shown by (3) in FIG. 5.

As a result of the CAM retrieval, the frame is discarded only when both of the IP DA and IP SA within the header information are mishit (at steps S10, S14). When at least either one is hit, the header information read from the content addressable memory 4 is converted into pseudo-random header information by a hash calculation performed by the hash calculating portion 16. Then, whether or not the MAC address of the header information exists is searched by the MAC table retrieving portion 17. In the presence of the MAC address, the MAC header is updated in the MAC header updating portion 18, the frame is buffered in the FIFO 19, and the frame is relayed from the bus converting portion 11 to the line bus B1 as shown by (4) in FIG. 5.

Figure 7:
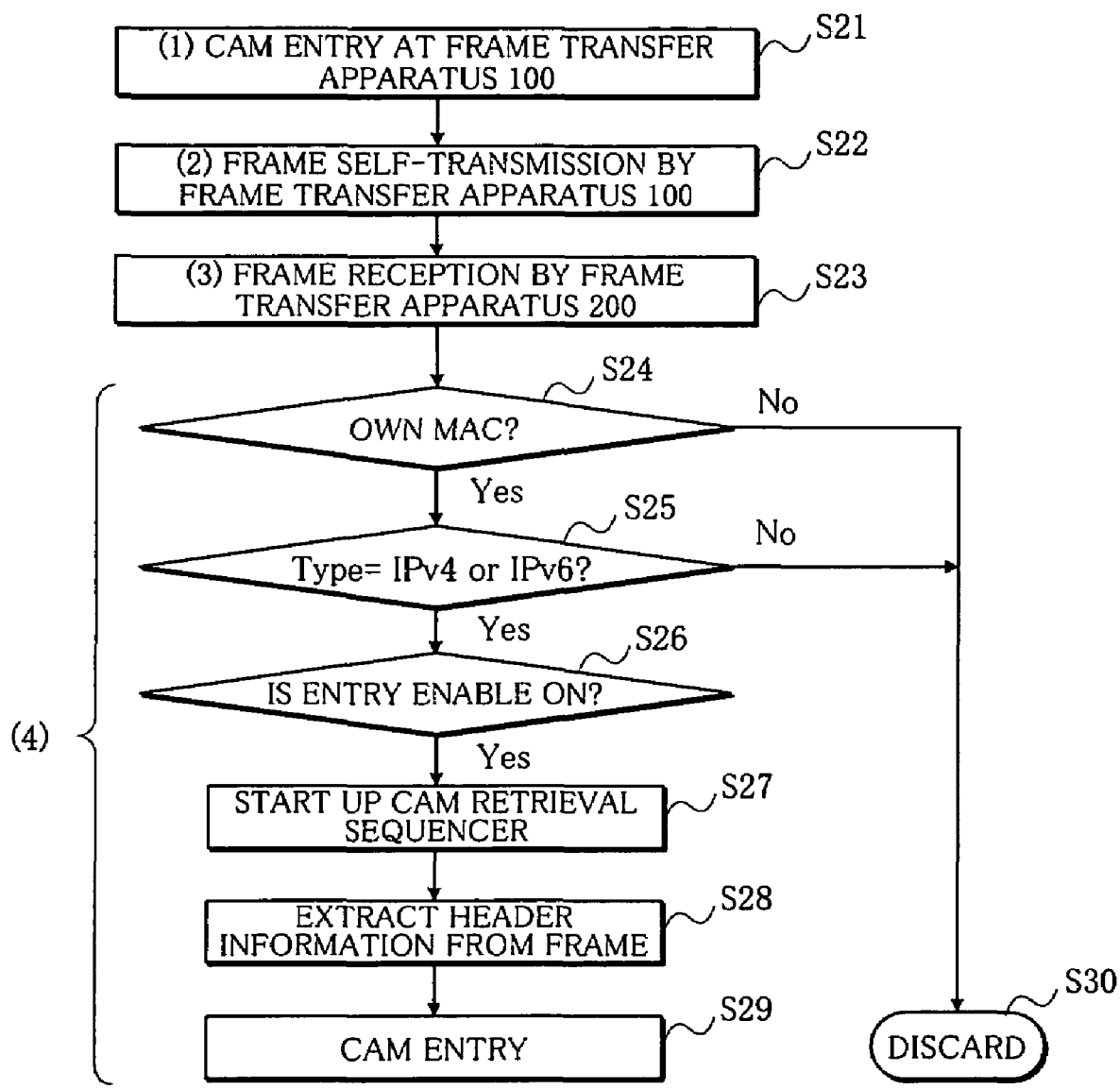
FIG. 7 is a flow chart showing an operation embodiment during a CAM entry in the bus bridge shown in FIG. 3.

During CAM Entry:

FIG. 7 shows a flow chart of an operation embodiment during a CAM entry. As shown by (1) in FIG. 8, the frame transferring apparatus 100 firstly executes the CAM entry to the content addressable memory 4 from the CPU 5 (at step S21) in the same way as the step S1 shown in FIG. 4.

Figure 8:
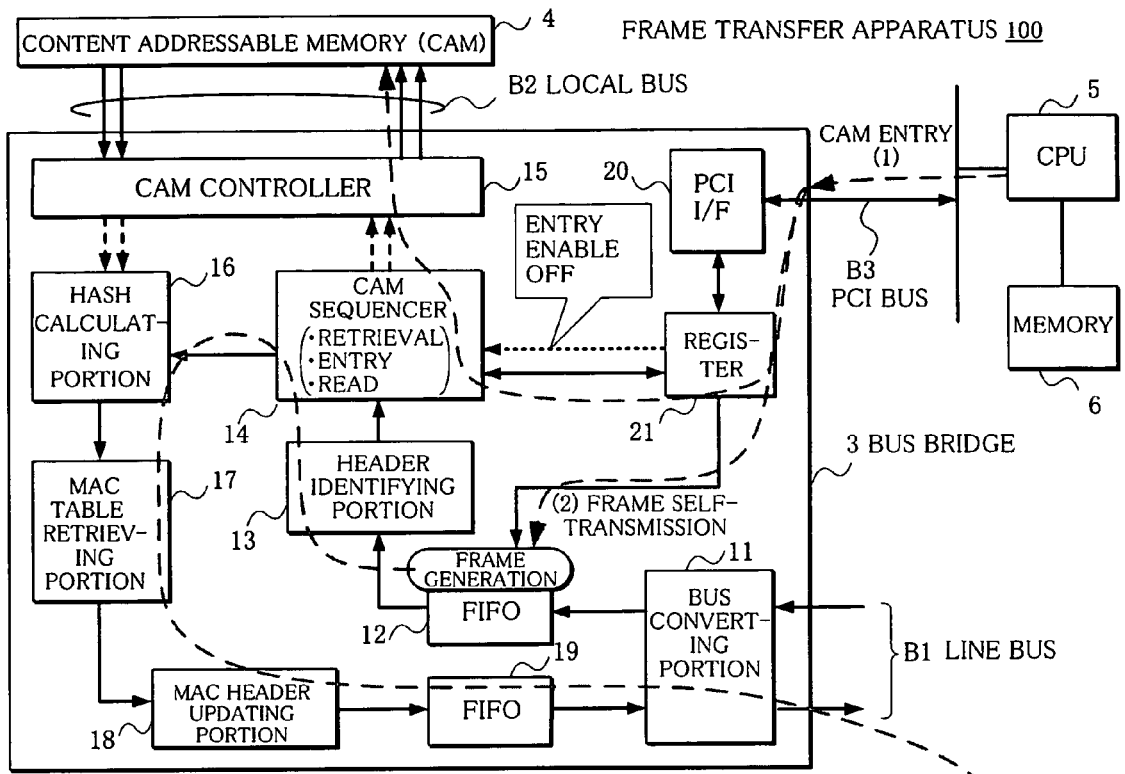
FIG. 8 is a block diagram schematically showing the operation embodiment of FIG. 7 applied to the frame transfer apparatuses shown in FIG. 2.
Figure 8:
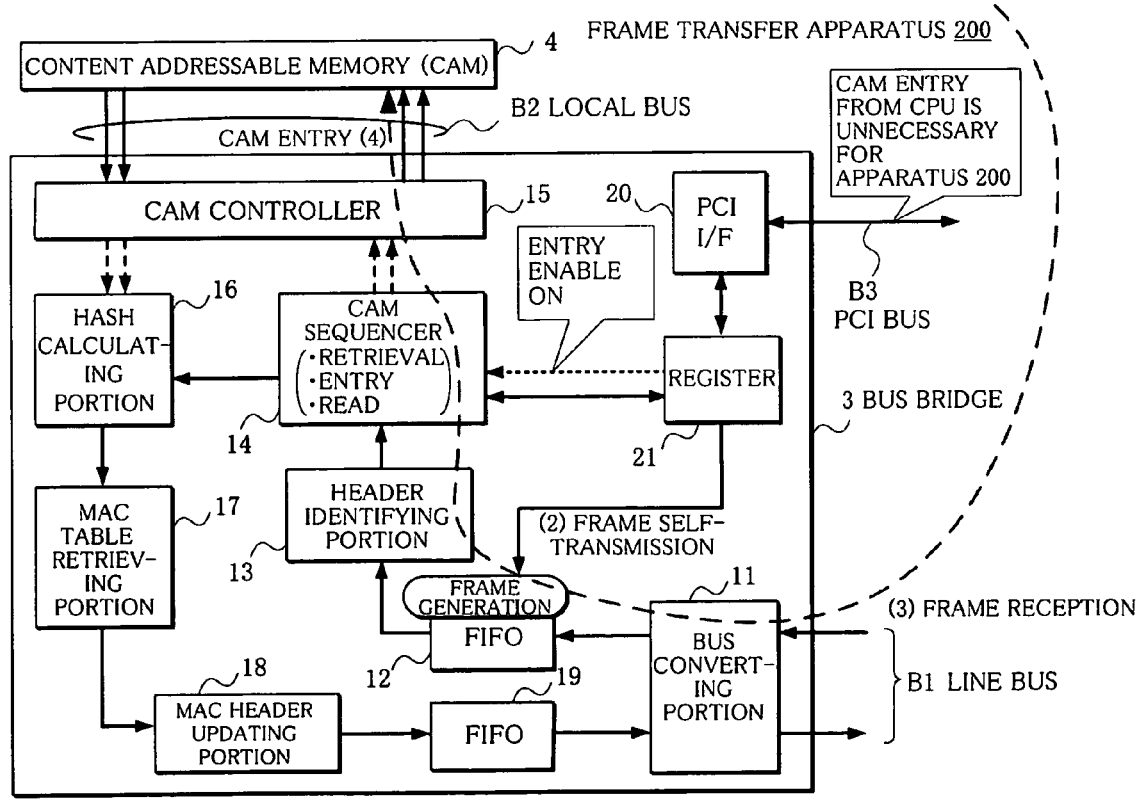
Figure 10:
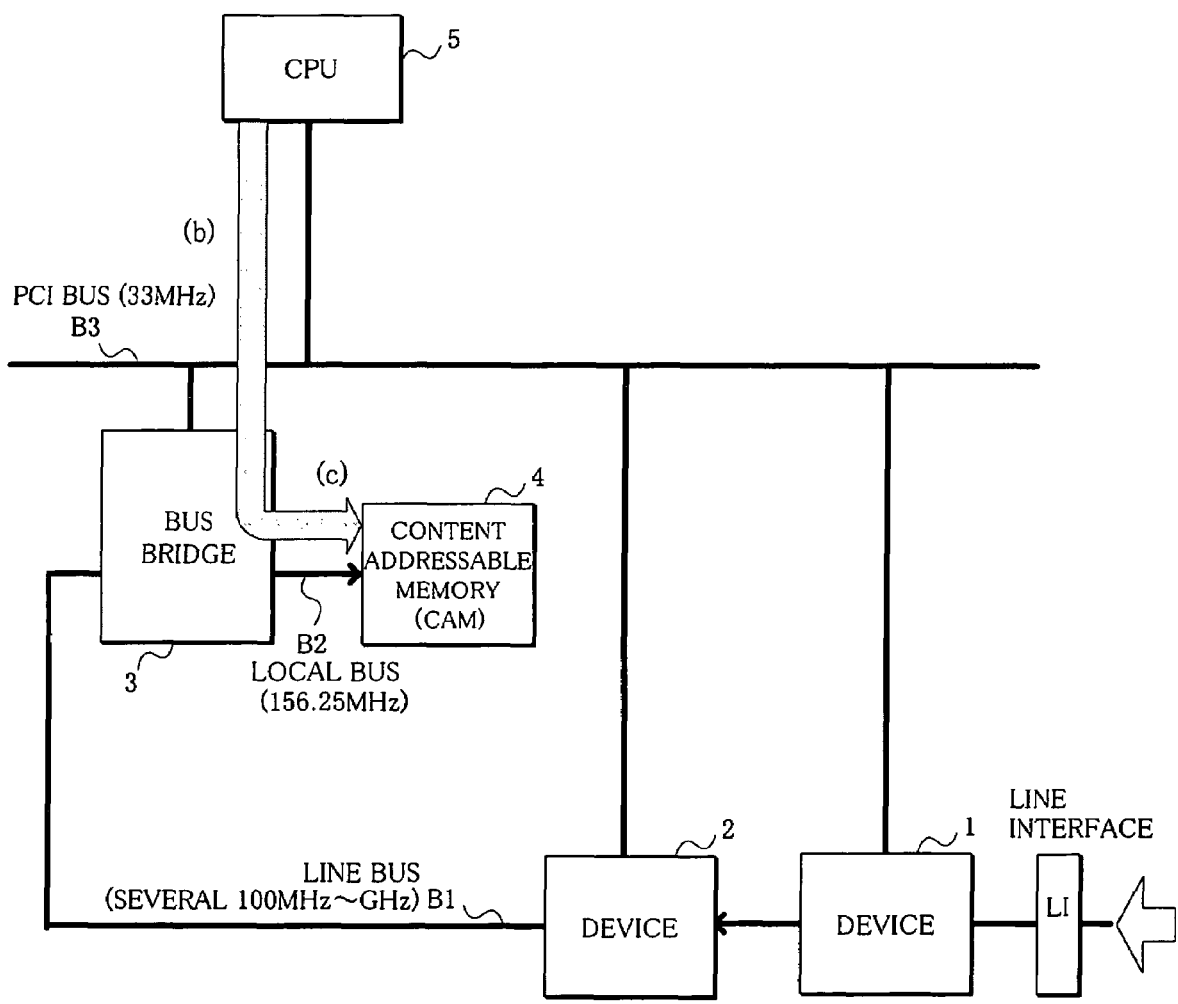
FIG. 10 is a block diagram schematically showing an arrangement of a prior art frame transfer apparatus.
Figure 11:
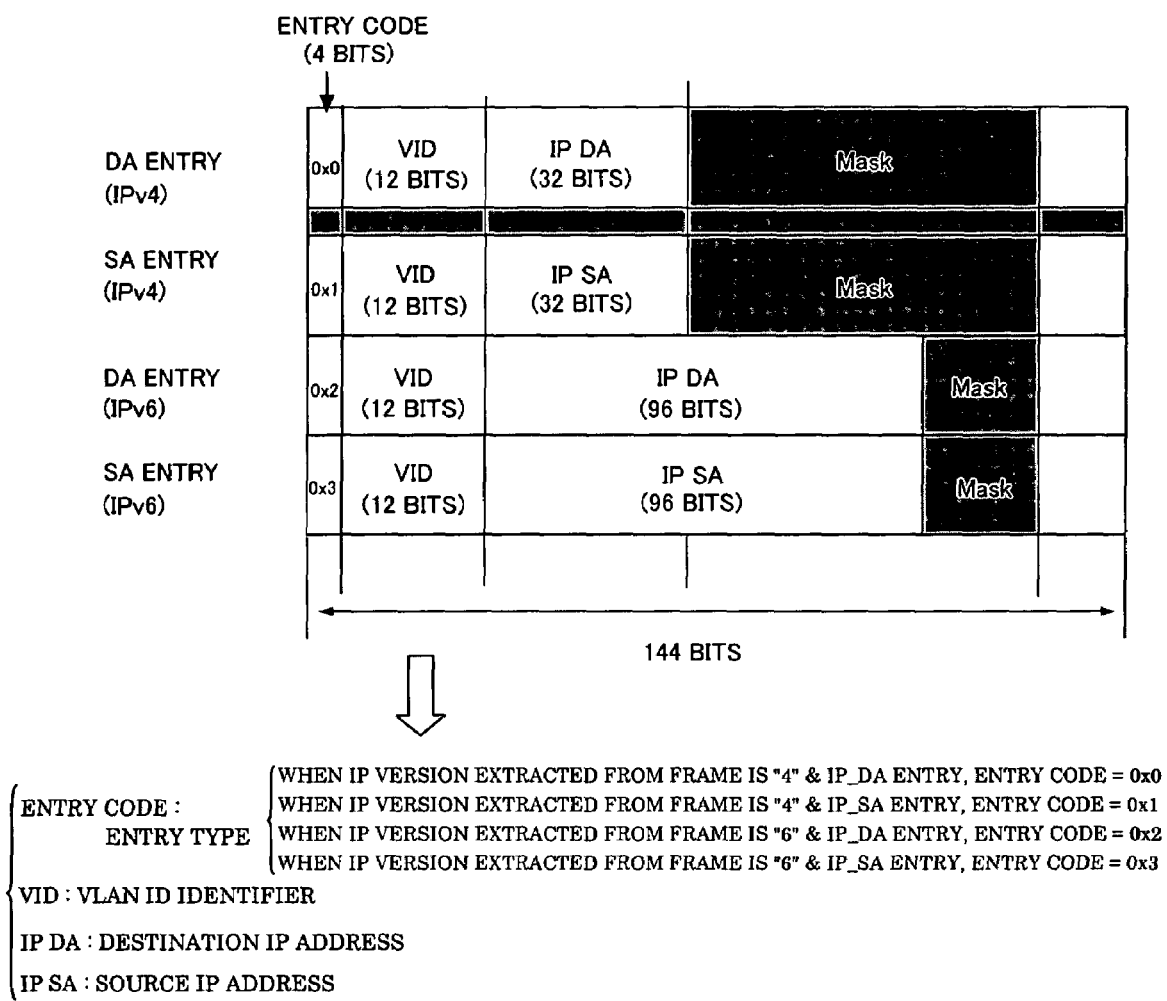
FIG. 11 is a diagram of a general table format within a content addressable memory.

Thereafter, the frame transfer apparatus 100 executes a frame self-transmission to the frame transferring apparatus 200 as shown by (2) in FIG. 8. Namely, the header information is transmitted from the CPU 5 to the FIFO 12 through the PCI bus B3, the PCI interface 20 and the register 21, so that a frame having the header information added is generated in the FIFO 12. This frame is transferred through the header identifying portion 13, the CAM sequencer 14, the hash calculating portion 16, the MAC table retrieving portion 17, the MAC header updating portion 18, the FIFO 19 and the bus converting portion 11, from the line bus B1 to the frame transferring apparatus 200 (at step S22).

When the frame transferring apparatus 200 thus receives the frame (at step S23) as shown by (3) in FIG. 8, steps S24-S26 are executed in the frame transferring apparatus 200 by the header identifying portion 13 in the same way as the steps S3-S5 in FIG. 4.

In the frame transferring apparatus 200 at this time, since the entry enable is preset to "ON" (at step S26) by the CPU (not shown) through the PCI bus B3, the PCI interface 20 and the register 21 to the CAM sequencer 14, steps S27 and S28 are executed. This corresponds to the processing of steps S6 and S7 in FIG. 4. Thus, the CAM sequencer 14 is able to enter the header information identified by the header identifying portion 13 into the content addressable memory 4 (at step S29) as shown by (4) in FIG. 8.

The performance will now be reviewed by a simulation.

Figure 12A:
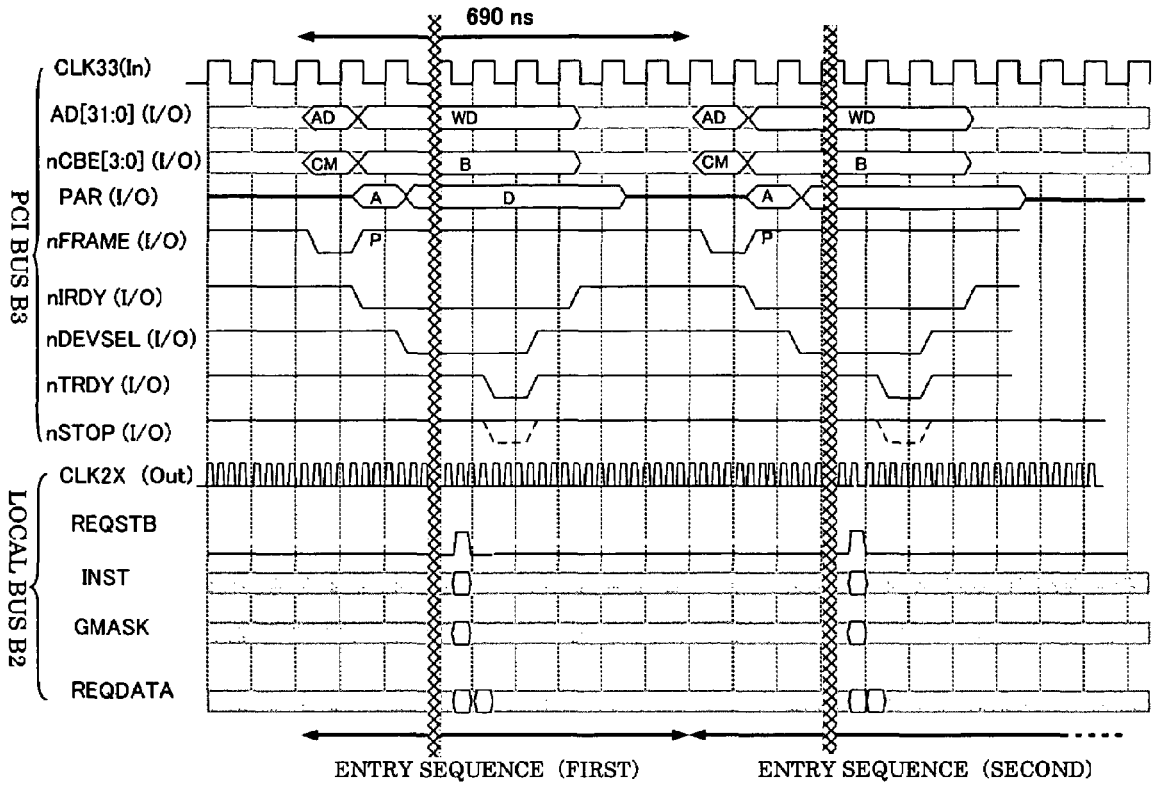
FIGS. 12A and 12B are timing charts showing an access to a content addressable memory respectively for the prior art and the present invention.

The prior art example requires time of about 690 nsec× 5=3.450 μs as shown in FIG. 12A for entering header information of an IP frame of 144 bits (32 bits×4.5) by the PCI bus B3 (33 MHz). When a plurality of IP frames are sequentially entered by this method, the CPU throughput is to be occupied for the corresponding time.

Figure 12B:
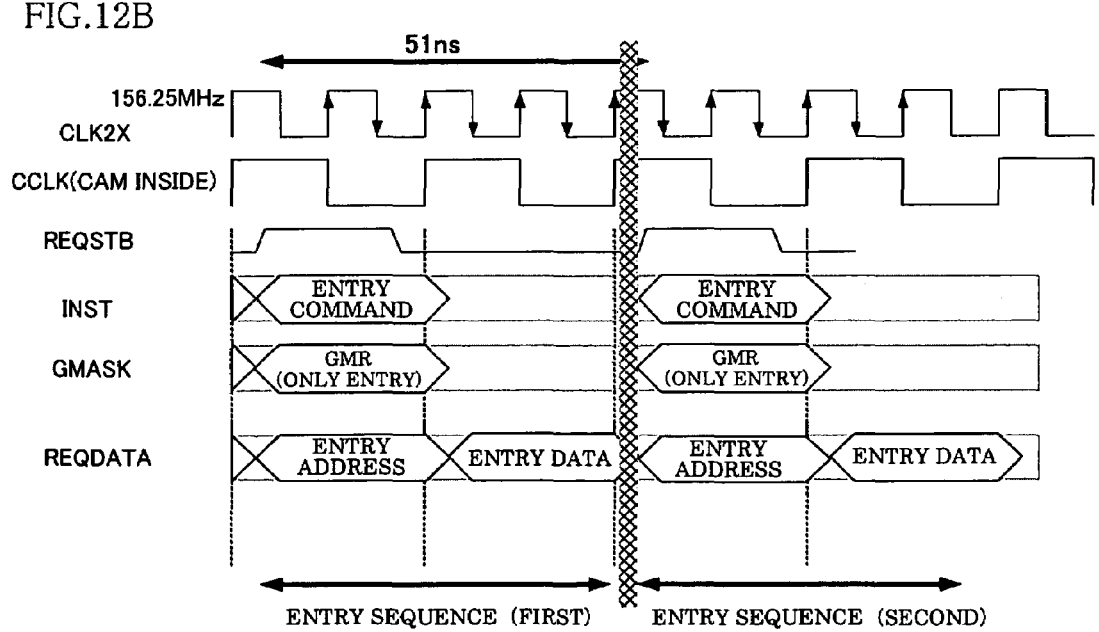

On the other hand, with the present invention, an entry is possible in about 51 nsec per one frame entry including the data conversion between the line bus B1 and the local bus B2 (FIG. 12B). Therefore, the CPU processing occupation time is extremely reduced compared to the prior art example, and the speed is enhanced by more than 60 times. (It is to be noted that CCLK is an internal system clock (78.125 MHz) of the content addressable memory 4.)

For example, when performing entry to the entire area of the content addressable memory 4, the content addressable memory 4 within the frame transfer apparatus where the present invention is applied, it is possible to enter 16 k pieces of 144 bit-entry data, while in the case of the prior art example through the PCI bus, it requires a time of about 3.450 μsec×16 k=56.524 msec until the completion of the entire entry of the CAM supposing that there is no access conflict on the PCI bus from other PCI devices.

On the other hand, it takes 51 nsec×16 k=0.835 msec until the completion of the entire entry in the present invention.

Also in the present invention, an access time delay due to the access conflict on the PCI bus B3 does not occur.

The timing charts shown in FIGS. 9A-9E are those of the header identifying portion within the bus bridge. The process is performed by dividing the frame shown in "frame format and header information extraction example (in case of IPv4 frame)" shown in FIG. 6 by 64 bits per 1 clock (see FIG. 9A).

Namely at clock 0, a MAC_DA and a part of a MAC_SA are extracted from rxfifo_pkt_lt1 (FIG. 9B). At clock 1, a part of the MAC_SA and an IP_Version identification candidate "A" are extracted from rxfifo_pkt_lt2 (FIG. 9C). At clock 2, an IP_Version identification candidate "B" is extracted from rxfifo_pkt_lt3 (FIG. 9D).

Based on the information extracted so far, according to the IP_Version identifying procedure of FIG. 9E, it is identified whether the frame is the IPv4, the IPv6, or a subject of discard. At this time, it is also determined whether or not the frame is a frame with a Tag.

It is to be noted that while in the above mentioned embodiment, the CAM entry is executed in the apparatus 200 by providing the frame to the frame transferring apparatus 200 from the frame transferring apparatus 100, it is also possible to perform a similar CAM entry based on a frame received from the line bus B1 in a certain form, for example, in only the frame transfer apparatus 100 or 200.

What is claimed is:

1. A frame transfer method comprising the steps of:
    setting to enable a data entry into a content addressable memory with an enable bit signal through a PCI bus; and
    entering, upon receipt of a transfer frame addressed to a first apparatus from a line bus which is faster in speed than the PCI bus, header information of the frame into the content addressable memory not through the PCI bus, based on the setting that the entry is enabled,
    the enable bit signal being set to OFF in a normal operation where the header information of the frame from the line bus is extracted for retrieval of the content addressable memory based on the header information and the frame is transferred only at a time of hit by the retrieval, and being set to ON in an entry operation of the content addressable memory where the header information of the frame from the line bus is extracted and is entered into the content addressable memory only when the header information is destined to the first apparatus itself.

2. The frame transfer method as claimed in claim 1, wherein the frame is prepared based on header information entered into a content addressable memory of a second apparatus and transmitted by the second apparatus.

3. The frame transfer method as claimed in claim 1, further comprising the step of discarding the frame when the frame is not addressed to the first apparatus.

4. A frame transfer apparatus comprising:
    means setting to enable a data entry into a content addressable memory with an enable bit signal through a PCI bus; and
    means entering, upon receipt of a transfer frame addressed to a first apparatus from a line bus which is faster in speed than the PCI bus, header information of the frame into the content addressable memory not through the PCI bus, based on the setting that the entry is enabled,
    the enable bit signal being set to OFF in a normal operation where the header information of the frame from the line bus is extracted for retrieval of the content addressable memory based on the header information and the frame is transferred only at a time of hit by the retrieval, and being set to ON in an entry operation of the content addressable memory where the header information of the frame from the line bus is extracted and is entered into the content addressable memory only when the header information is destined to the first apparatus itself.

5. The frame transfer apparatus as claimed in claim 4, wherein the frame is prepared based on header information entered into a content addressable memory of a second apparatus and transmitted by the second apparatus.

6. The frame transfer apparatus as claimed in claim 4, further comprising means discarding the frame when the frame is not addressed to the first apparatus.

7. The frame transfer apparatus as claimed in claim 4, further comprising means discarding the frame when the frame is neither an IPv4 frame nor an IPv6 frame.

8. The frame transfer apparatus as claimed in claim 4, further comprising means discarding the frame when the frame is not entered into the content addressable memory.

9. The frame transfer apparatus as claimed in claim 5, wherein the frame is generated by a frame generating function of the first apparatus and transmitted by a function of transmitting the frame to the second apparatus.

10. The frame transfer apparatus as claimed in claim 7, further comprising means determining whether or not the frame is a frame with a Tag.

11. The frame transfer apparatus as claimed in claim 9, wherein the frame generating function has a function of generating both of the IPv4 and IPv6 frames.

* * * * *